Oct. 18, 1932.            M. C. W. TOMLINSON            1,883,116
            DEVICE FOR DETERMINING THE CONDITION OF A GAS
                        Filed Feb. 16, 1929

Inventor
Malcolm C.W. Tomlinson
By [signature] Att'y.

Patented Oct. 18, 1932

1,883,116

UNITED STATES PATENT OFFICE

MALCOLM CLAIRE WEYANT TOMLINSON, OF LOCH ARBOUR, NEW JERSEY, ASSIGNOR TO WESTERN ELECTRIC COMPANY, INCORPORATED, OF NEW YORK, N. Y., A CORPORATION OF NEW YORK

DEVICE FOR DETERMINING THE CONDITION OF A GAS

Application filed February 16, 1929. Serial No. 340,640.

This invention relates to a device for determining the condition of a gas, and more particularly the dew point thereof.

The primary object of the invention is to provide a simple and efficient device for accurately determining a characteristic of a gas.

In order to attain this and other objects and in accordance with the general features of the invention, one embodiment thereof includes a chamber having openings for a source of light and for the inlet and outlet of a gas, the dew point of which is to be determined. Upon the admission of the gas into the chamber, the gas comes in contact with a platinum plate coated with platinum black which is subjected exteriorly of the chamber to a refrigerant until the dew point of the gas is reached; that is, until droplets of moisture or frost flakes appear on the platinum black. The beams of light from the source thereof, directed on the platinum black, are then reflected by the droplets of moisture or frost flakes to the polished interior of the chamber, and thence to a light sensitive cell for controlling an indicator or recorder. The temperature at which condensation takes place is indicated by a thermocouple attached to the platinum plate within the chamber and a suitable associated instrument.

In an alternative embodiment of the invention, the light sensitive cell is omitted and the black surface of the platinum plate is observed through a microscope.

Figure 1:
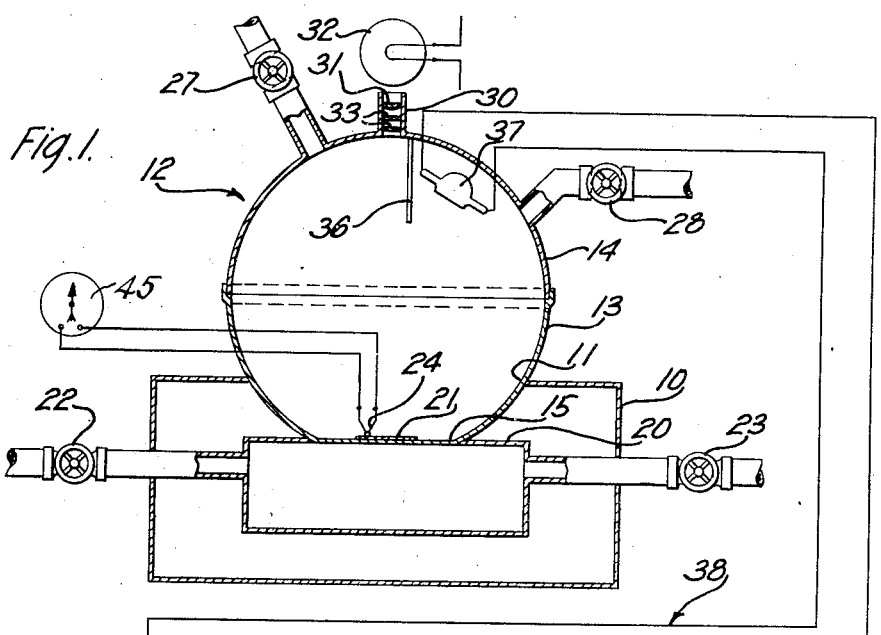
Figure 2:
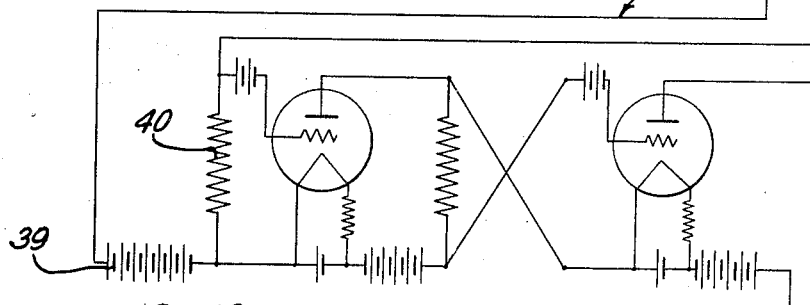
Figure 2:
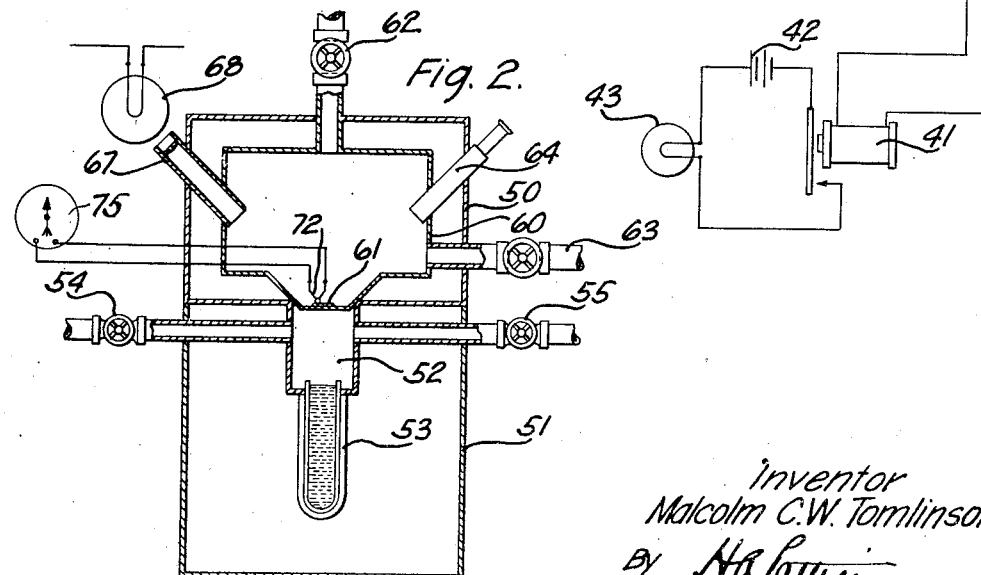

It is believed that a complete understanding of the invention may be had by reference to the following description taken in conjunction with the accompanying drawing, in which Fig. 1 is a fragmentary cross sectional view of a device embodying the features of the invention shown in association with a diagrammatic view of an indicating mechanism and Fig. 2 is a fragmentary cross sectional view of an apparatus embodying a modified form of the invention.

Referring now to Fig. 1 of the drawing, a container 10 composed of a material having poor heat conducting qualities, such as balsa wood, is provided with a circular opening 11 in which a metallic chamber 12 is seated to form an air-tight connection with the container. The chamber 12 is of spherical shape and is divided into two halves, 13 and 14; the lower half 13 having an opening 15, the walls of which are suitably sealed to a box 20. In the top of the box 20 is an insert of sheet platinum 21, the upper surface of which, within the chamber 12, is covered with platinum black. In place of the thin sheet of platinum, a sheet of lead, bismuth, rosemetal or any other metal of low heat conductivity having a surface covered with platinum black may be successfully used. Inlet and outlet valves 22—23, respectively, for the box 20 are provided for admitting a refrigerant, such as carbon dioxide, sulphur dioxide, ethyl chloride, methyl chloride, or butane, depending upon the range of the temperatures desired. A thermocouple 24 placed on the platinum sheet 21 is connected to a suitable instrument 45, well known to the art, for indicating the temperature. The upper half 14 of the chamber 12 is sealed to the lower half 13 and has inlet and outlet valves 27 and 28, respectively, for controlling the admission into the chamber of a gas to be tested. At the top of the chamber 21 is a tube 30 having therein an aspheric condenser lens 31 for directing a beam of light from a lamp 32 on the platinum sheet 21. Also mounted in this tube are a pair of spaced glass filters 33—33 for removing the glare from the light beam and for cooling the beam of light as it passes through the intervening air space.

To the right of the tube 30, within the chamber 12, a light-proof curtain 36 is positioned so as to shield a photoelectric cell 37 from any direct light coming from the lamp 32. The photoelectric cell 37 is connected to the input circuit of a two-stage vacuum tube amplifier 38 through a battery 39 and a high resistance 40. Connected to the output side of the amplifier 38 is a relay 41 adapted to operate a signal circuit having a battery 42 and an incandescent lamp 43. It will be understood that any suitable indicator or recorder can be connected to the output side of the amplifier 38.

In operating the device to determine the dew point of the gas, the inlet valve 27 and outlet valve 28 are adjusted to permit a continuous flow of the gas to be tested into the chamber 12. The inlet valve 22 of the box 20 is then opened to admit small quantities of carbon dioxide from a source of supply thereof (not shown). As the gas to be tested comes into contact with the sheet of platinum and the temperature thereof decreases due to the action of the refrigerant, such as carbon dioxide, droplets of moisture or frost flakes will appear on the platinum black covering the platinum sheet 21 when the dew point is reached. The beam of light from the lamp 32 directed on the platinum black is reflected by the droplets of moisture or frost flakes to the polished interior of the chamber 12 and thence to the photoelectric cell 37. The light beam thus enters and energizes the photoelectric cell and causes a current to flow from the battery 39 through the resistance 40, thereby changing the potential of the input circuit. This change causes the amplifier 38 to transmit sufficient current to operate the relay 41 which closes a circuit, and causing the battery 42 to light the lamp 43. The illumination of this lamp is a signal to the operator that the dew point of the gas has been reached. By means of the thermocouple 24, the observer notes the temperature at which the condensation took place and this is the dew point temperature.

Thus it is seen that by the use of the simple device of this invention, accurate determinations can be made of the dew points of not only air-water vapor samples, but also of any other air-vapor mixtures.

In a modified form of the invention as illustrated by Fig. 2, the dew point determinator includes two balsa wood containers 50—51 having waterproofed internal walls. The lower container 51 has a cold gas space 52, at the bottom of which is positioned a Dewar flask 53 containing liquid air for a refrigerant. Connected with the cold gas space 52 are valves 54—55 for admitting air to thereby prevent the building up of gas pressures within the space 52 and to furnish a means for controlling the temperature. Within the upper balsa wood container 50 is positioned a metallic chamber 60 having a platinum sheet 61 covered with platinum black. This chamber 60 is also provided with inlet and outlet valves 62—63 for controlling the admission of a gas to be tested, and with a microscope 64 for observing the presence of droplets of moisture or frost flakes on the platinum black covering the sheet of platinum 61. A tube 67 extending into the chamber 60 directs light from a lamp 68 to effectively illuminate the sheet of platinum 61. In order to determine accurately the temperature within the chamber 60, a thermocouple 72 is provided.

In operation, the gas to be tested is introduced into the chamber 60 through the valves 62—63 and comes into contact with the platinum sheet 61 which is exposed to the refrigerating action of the liquid air in the Dewar flask 53. When the dew point of the gas is reached, droplets of moisture or frost flakes are formed and their presence can be readily ascertained by observing the platinum sheet 61 through the microscope 64. Upon their appearance, the dew point temperature reading is obtained by the use of the thermocouple 72 and a suitable associated instrument 75.

It will be understood that the embodiments of the invention herein described and illustrated are merely convenient and useful forms of the invention which is capable of many other modifications without departing from the spirit and scope of the invention as defined by the appended claims.

What is claimed is:

1. In a device for determining the condition of a gas, an indicating means, a chamber, means for introducing the gas to be tested into the chamber, a sheet of metal having a surface coated with platinum black, a source of light, means for filtering a beam of light therefrom, means for directing said beam of light on the platinum black surface, a light sensitive means positioned within the chamber, means for protecting the light sensitive means from any direct light from the source thereof, means for refrigerating the sheet of metal to effect the precipitation of a condensation from the gas upon the platinum black surface to reflect a beam of light into the light sensitive means, and means responsive to the energization of the light sensitive means for operating the indicating means.

2. In a device for determining the condition of a gas, an indicating means, a chamber, means for introducing the gas to be tested into the chamber, a metallic non-light reflecting element within said chamber, a light sensitive means positioned within said chamber, means for altering the temperature of said metallic non-light reflecting element to effect the precipitation of a condensation from the gas upon said element to reflect a beam of light into said light sensitive means, means responsive to the energization of the light sensitive means by said reflected beam of light for operating said indicating means, and means for indicating the temperature of said element.

In witness whereof, I hereunto subscribe my name this 31st day of January A. D., 1929.

MALCOLM CLAIRE WEYANT TOMLINSON.